July 29, 1958 — E. F. WICKENS ET AL — 2,845,143
AIR LINE LUBRICATOR
Filed Nov. 23, 1955
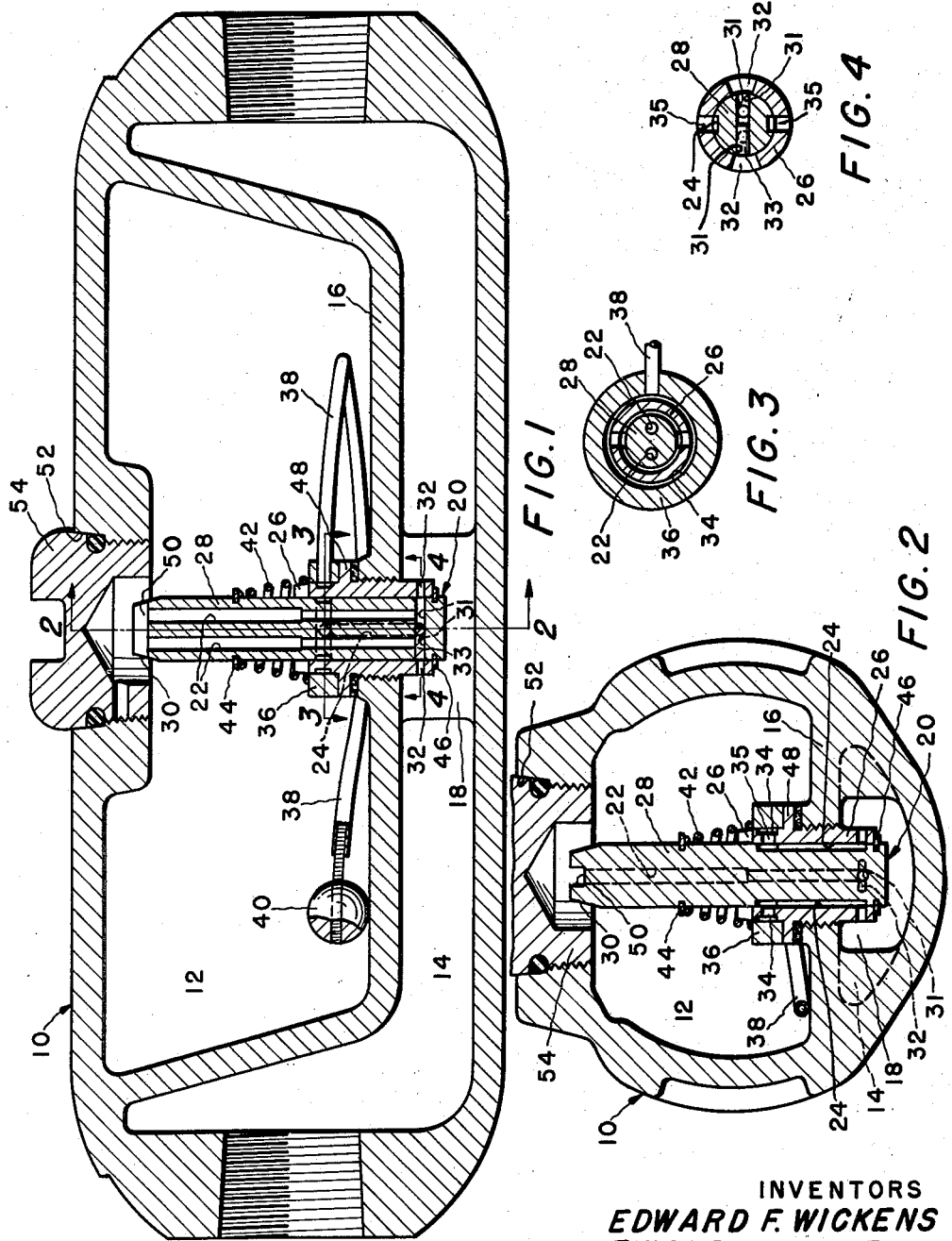
INVENTORS
EDWARD F. WICKENS
EWALD H. KURT
BY
THEIR ATTORNEY United States Patent Office 2,845,143
Patented July 29, 1958

2,845,143

AIR LINE LUBRICATOR

Edward F. Wickens, Phillipsburg, N. J., and Ewald H. Kurt, Easton, Pa., assignors to Ingersoll-Rand Company, New York, N. Y., a corporation of New Jersey Application November 23, 1955, Serial No. 548,696

12 Claims. (Cl. 184—55)

This invention relates to air line lubricators, and more particularly to an air line lubricator which is capable of operating and supplying a relatively constant quantity of oil to air in air lines where the pressure fluctuates.

In most prior art lubricators the constructions are similar and the principle of operation is basically the same. The lubricator includes a casing having an air passage therethrough for connection in an air line. Formed in the same casing is an oil reservoir, or chamber, having an inlet opening and oil outlet both leading from the air passage to the oil chamber. Thus, air pressure existing in the air passage applied to the oil in the chamber whereby oil is forced from the chamber through the oil outlet into the air passage. The differences in existing oilers exist primarily in the method controlling the rate of the flow of oil through the outlet.

One common expedient is to provide a fixed air inlet opening and to control the oil flow by varying the size of the oil outlet, as by means of a small valve. Another common design is to provide a fixed air inlet and a fixed oil outlet for the oil chamber. Oil flow is varied by varying the position of the ends of such inlet and outlet relative to the air flow through the air passage.

In both of these designs there is a tendency to supply an excess of oil to the air due to pulsations of pressure in the air line. Specifically, any sudden drop in air pressure in the air line creates a relatively high pressure differential between the oil chamber and the air inlet. In the first mentioned design, such differential causes a rush of air from the oil chamber through the full open air inlet which draws oil from the oil chamber into the air line. In the second design, this pressure differential tends to force an excess of oil through both full open oil and air passages.

The present invention prevents such injection of a slug of oil into the air passage, whenever the rate of oil feeding is approximately 50% or less of the maximum rate. This is accomplished by controlling simultaneously the degree of opening of both the air inlet and oil outlet passages over such lower range of feeding rate. That is, over this range whenever the oil outlet is reduced in flow area, or stopped down, the air inlet is correspondingly stopped down. Inasmuch as the degree of opening of the valve controlling these passages is normally determined by the rate of flow of air through the passages, the quantity of oil injected in the air stream during any pressure pulsation corresponds to the rate of flow of air. Accordingly, whenever the valve is in a position corresponding to a moderate or low rate of flow of air, and there is an abnormal pressure pulsation, there is considerable resistance to the flow of oil through the inlets between the oil supply chamber and the air passage thereby preventing the injection of a slug of oil into the air passage during this pressure fluctuation.

It is accordingly one object of this invention to provide an air line oil lubricator in which the quantity of oil supplied to the air is maintained relatively constant regardless of variations in pressure pulsations in the air line.

The further object of this invention is to provide an air line lubricator which is capable of operating effectively any installations where the air pressure is fluctuating or relatively constant.

Another object is to provide an oiler which is capable of operating effectively regardless of the direction of air flow through the oiler.

Still another object is to provide an oiler in which the rate of oil feeding may be easily and accurately varied.

Further obejcts will become apparent from the following specification and drawings in which Figure 1 is a longitudinal elevation, partly in section, of an air line oiler constructed in accordance with the practice of this invention, Fig. 2 is a cross sectional view of Fig. 1 taken along the line 2—2 looking in the direction of the arrows, Figs. 3 and 4 are cross sectional views of the valve shown in Fig. 1 taken along the lines 3—3 and 4—4, respectively, looking in the direction of the arrows.

Referring to the drawings a preferred form of the air line oiler is shown as comprising a casing 10 defining an oil chamber 12 and an air conduit 14 separated by partition 16. The central portion of the air conduit 14 is somewhat restricted to form a throat 18 so as to obtain a venturi effect such that there is a pressure differential between the inlet and discharge side of the throat when there is a flow of air through the air conduit. This pressure differential is required to obtain a pressure differential between the air chamber and the oil chamber for operation of the oiler in installations where the air flow remains relatively constant. It is to be noted also that the air conduit is substantially symmetrical on each side of the line 2—2 such that the oiler operates equally well regardless of the direction of the flow of air through the air conduit.

A valve 20 controlling the supply of oil to the air conduit 14 contains a pair of air inlet passages 22 and a pair of oil outlets 24 formed, respectively, in the movable valve part 28 and the stationary valve part 26. The stationary part 26 is in the form of a bushing threaded through the partition 16 with one end portion extending into the air conduit 14 and the opposite end portion extending into the oil chamber 12. The movable part 28 is rotatably fitted in the stationary part 26 and is of considerably greater length than the stationary part 26 such that the inner end 30 extends well above the oil level in the chamber 12 to minimize the possibility of any oil flowing through the air inlets 22 when the oiler is upright.

The air inlets 22 extend longitudinally through the movable part 28 from the end 30 to a point adjacent the opposite end thereof terminating in a common cross passage portion 31 extending through the part 28. The passage portion 31 registers at its opposite ends with ports 32 in the stationary part 26 and forming a continuation of the air passages. It is to be noted that the ports 32 are positioned 180° from each other and in axial alignment with the venturi throat. The port on the left is used when air flow through the oiler is from left to right (as viewed in Fig. 1), whereas, for reverse flow, the other, or right hand port is used. In order to cut off flow through the inlet 22 not in use, a valve member 33 is provided. This valve is tubular in shape and has a loose fit in the passage portion 31 and is limited to movement therein by the stationary part 26 as the ports 32 are smaller than the valve member 33. It is to be noted that although two air passages 22 are shown, a single centrally located passage could be used so long as the length of the valve member is shorter than the distance between the valve stop and the juncture of the air passage with its branch, or cross, passage.

The oil passages or outlets 24 are somewhat similar in form to the air passages except that they are completely separate at the inlet ends. The downstream, or inlet, ends of the oil passages register with ports 35 in the stationary part 26 and are positioned 90° relative to the air ports. The upstream ends of the oil passages terminate in an annular groove 34 formed in the stationary part 26. A ring 36 is rotatably mounted at the stationary part 26 overlying the groove 34. A rubber covered prestressed spring element, or conduit, 38 is connected at one end to the ring 36 and is provided with a weight 40 at its opposite end.

The movable valve part 28 is held in position relative to the stationary part 26 by means of a spring 42 biased between a spring retainer 44 and the ring 36. The spring 42 constantly urges the movable part 28 in a direction to hold a friction element 46 mounted on the end of the part 28 into contact with the end of the stationary valve part 26. The spring 42 serves the additional purpose of holding the ring in its longitudinal position by urging it into contact with a flange 48 on the stationary part 26. The strength of the spring 42 is such that it holds the two parts of the valve 20 in frictional engagement against rotary movement and holds the ring 36 against longitudinal movement, but permits relatively free rotation of the ring 36.

In order to permit relatively easy adjustment of the position of the valve 20, the end 30 of the movable part 28 is provided with a slot 50 for receiving a screw driver or similar tool for rotation of this valve part. The end 30 of this valve part is located in line with an opening 52 in the casing 10, used when filling the oil chamber 12, such that it is readily accessible for adjustment by merely removing the oil cap 54.

It is to be noted that with this air line oiler it is possible to connect either end of the air conduit 14 to the upstream side of the hose line in which it is connected—that is, it is capable of operating regardless of the direction of flow through the oiler. Moreover due to the location of the downstream ends of the air inlets 22 and the provision of the flexible conduit 38, the oiler can operate in any position, and finally that the oiler is capable of operating where the air pressure in the conduit 14 is fluctuating or relatively constant.

The operation of the oiler will be first described for installations where there is a relatively constant air flow without pressure fluctuations through the air conduit 14. It will be assumed that air is flowing from right to left through the conduit 14, as viewed in Fig. 1. The flow of air through the throat 18 of the conduit 14 pushes the valve 33 toward the downstream side to the left as viewed in Fig. 1 of the venturi to close off this downstream air inlet 22 and open the upstream inlet. Such flow also creates a pressure gradient of, e. g., one pound per square inch along the throat 18, the higher pressure existing on the upstream side of the throat and decreasing gradually in the downstream direction. Because the ends of the two oil passages 24 are downstream relative to the such upstream air inlet 22, the pressure at the ends of the oil passages 24 is slightly lower than the pressure at the upstream air inlet, and accordingly the pressure within the oil chamber 12 is somewhat greater than the pressure at the discharge ends of the oil passages 24. The higher pressure on the oil forces oil from the chamber 12 through the conduit 38 and into the oil passages 24 and thence into the air stream passing through the air conduit 14. The rate of feeding of oil for any given rate of flow of air may be adjusted by rotating the movable valve part 28. It is to be noted that air ports 32 are of somewhat greater circumferential dimension than that of the associated ends of air passage portion 31, whereas the oil ports 35 substantially match the associated ends of the oil passages 24.

With this construction, over approximately the upper 50% of the range of the oil feed rate, only the oil outlet flow area is restricted, whereas over the lower oil feed rate range, the flow area of the oil and air passages are restricted simultaneously. The reason for this is to obtain finer feed rate adjustment and feed rate adjustment proportional to the valve adjustment—that is, a turn of the movable part 28 of about six degrees from the full open position, which is about ¼ of the valve movement from full open to a closed position, results in the reduction of oil feed rate by approximately ¼. It is recognized that at valve positions in the upper feed rate range that the air line is full open for reverse flow in the event of a pressure pulsation so that oil could flow through the air inlet to the air conduit, but this has proven to be not objectionable as such action can occur only when the rate of air flow through the oiler is relatively high. That is, ordinarily the greater the air flow, the higher the desired oil feed rate. Under these conditions such an oil slug is rapidly dispersed in the air.

In installations where the pressure of air flowing through the air conduit 14 is pulsating, the operation of the oiler is as follows. The flow of air through the air conduit causes the valve 33 to move to close off the downstream air inlet and open the upstream inlet. The pressure of the air in the oil chamber 12 will, because of restricted communication with the air conduit 14 through the air inlet 22, remain at a relatively constant value intermediate the maximum and minimum pressures in the air passage. (The pressure in the oil chamber will, of course, fluctuate to a minor extent depending upon the degree of opening of the air inlet 22 and the magnitude and frequency of the pressure pulses in the air conduit 14.) Thus whenever the pressure in the air conduit 14 drops below the pressure in the oil chamber, a small quantity of oil will be forced through the conduit 38 through the oil outlets 24 and thence into the air stream. When the pressure in the air conduit 14 is below that in the oil chamber 12 there is a tendency for air also to flow from the oil chamber into the air conduit. However, this tendency is minimized at the lower oil feed rate settings of the valve by the simultaneous control of both the oil inlet and oil outlet as previously explained.

We claim:

1. An air line lubricator comprising, a casing having an oil chamber therein and an air conduit therethrough, and means having an air inlet passage communicating said conduit with the interior of the oil chamber and an oil passage for the flow of oil from the chamber to said conduit, said means including a valve for simultaneously restricting flow area through said passages.

2. An air line lubricator as claimed in claim 1 in which said conduit has a portion of restricted flow area to create a pressure gradient therealong in air flowing therethrough and one end of each of said passages is located in such portion at longitudinally displaced points relative to flow through said portion.

3. An air line lubricator as claimed in claim 1 in which said means includes two parts with a portion of each of said passages being formed in each part, one of said parts being movable relative to the other of said parts to vary the communicating area of each passage portion in one valve part with the corresponding passage portion in the other part.

4. An air line lubricator as claimed in claim 1 in which said means includes a stationary part and a movable part, the stationary part being mounted on the casing with one end portion thereof exposed to the air conduit and the other end thereof exposed to the oil chamber, said movable part being rotatably mounted on the stationary part.

5. An air line lubricator as claimed in claim 4 in which frictional means are provided for holding the movable part against unintended movement relative to the stationary part.

6. An air line lubricator as claimed in claim 4 in which the stationary part is provided with a central bore to receive the movable part, a frictional element is mounted on one of said parts and arranged to bear on the other of said parts, and spring means bear against the movable part for holding said parts in frictional engagement with said element.

7. An air line lubricator comprising a casing having an oil chamber therein and an air conduit therethrough, said casing including a partition between said chamber and conduit, and a valve having an air passage for conducting air from said conduit to the chamber and a separate oil passage for the flow of oil from the chamber to said conduit, said valve including a stationary part mounted in the partition and having a bore therethrough, a movable valve part rotatably mounted in said bore, said oil and air passages each having a portion formed in each of said valve parts and arranged such that rotation of the movable part relative to the stationary part varies simultaneously the flow area through said passages.

8. The air line lubricator claimed in claim 7 in which said oil passage terminates in a portion of the stationary part lying within the oil chamber, a ring encircles a portion of the stationary part lying within the oil chamber, an oil feed line connected to said ring is communicated with said oil passage, friction means between said valve parts hold the movable part in frictional engagement with the stationary part, and spring means are connected to said movable part and bear against said ring for holding said ring in longitudinal position relative to the stationary part and for holding said movable part in such frictional engagement with the stationary part.

9. The air line lubricator claimed in claim 7 in which the portion of said air passage located in the stationary valve part is of greater length in the plane of movement of the movable part than the associated end of the remaining air passage portion such that the flow area through the air passage is reduced simultaneously with the reduction in flow area of the oil passage only after the oil passage has been partially restricted.

10. An air line lubricator comprising, a casing having an oil chamber therein and an air conduit therethrough, a member extending from the air conduit into said oil chamber having an oil passage therein for feeding oil from said chamber into said conduit, an air passage in said member leading from said conduit to the oil chamber, said air passage having a branch portion with one end facing in one direction generally along the longitudinal axis of the conduit and another end facing in the opposite direction, and a valve for preventing flow through the end of said branch portion facing in the direction, or downstream, of flow through said conduit.

11. The lubricator claimed in claim 10 in which said valve is operated automatically by the flow of air through the conduit.

12. The lubricator claimed in claim 10 in which said branch portion extends completely through said member and has an axis substantially parallel with the direction of flow in the conduit portion in which it is located, and in which said valve comprises an element reciprocably mounted in said portion and actuated by the flow of air into said portion.

References Cited in the file of this patent

UNITED STATES PATENTS

| | | |
|---|---|---|
| 2,571,098 | Arnold | Oct. 16, 1951 |
| 2,730,269 | Earle | Jan. 10, 1956 |
| 2,751,045 | Faust | June 19, 1956 |